(12) United States Patent
Baker et al.

(10) Patent No.: US 6,881,898 B2
(45) Date of Patent: Apr. 19, 2005

(54) REMOTE DISTRIBUTION CABINET

(75) Inventors: Robert E. Baker, Columbus, OH (US); Michael R. Harper, Galloway, OH (US); James K. Martin, Columbus, OH (US); Randall F. Mathis, Columbus, OH (US)

(73) Assignee: Liebert Corporation, Columbus, OH (US)

(*) Notice: Subject to any disclaimer, the term of this patent is extended or adjusted under 35 U.S.C. 154(b) by 0 days.

(21) Appl. No.: 10/087,611

(22) Filed: Mar. 1, 2002

(65) Prior Publication Data
US 2002/0157846 A1 Oct. 31, 2002

Related U.S. Application Data
(60) Provisional application No. 60/272,842, filed on Mar. 2, 2001.

(51) Int. Cl.[7] .................................................. H02G 3/08
(52) U.S. Cl. ........................ 174/50; 174/59; 312/223.1; 361/600; 361/724; 361/601
(58) Field of Search .................... 361/641, 644, 361/651, 673, 826, 827, 724, 600, 601, 602, 627, 628, 634; 174/50, 59, 63, 17 R, 53, 54, 58; 312/223.6, 223.1, 223.2, 351.1; 220/3.2, 4.02, 4.01; 455/347, 349, 348; 52/220.1, 220.3, 220.5, 220.7

(56) References Cited

U.S. PATENT DOCUMENTS

| | | | | |
|---|---|---|---|---|
| 1,887,088 A | * | 11/1932 | Frank | .......................... 361/826 |
| 2,480,568 A | | 8/1949 | Garvin | |
| 3,618,804 A | * | 11/1971 | Krause | .......................... 174/50 |
| 4,016,357 A | | 4/1977 | Abrahamsen | |
| 4,296,574 A | | 10/1981 | Stephens | |
| 4,517,623 A | * | 5/1985 | Barner et al. | ............ 312/223.6 |
| 4,536,612 A | * | 8/1985 | Domigan | ..................... 174/48 |
| 4,783,718 A | * | 11/1988 | Raabe et al. | ................. 361/652 |
| RE33,220 E | * | 5/1990 | Collier | ......................... 52/263 |
| 5,053,637 A | * | 10/1991 | Dillard | ......................... 307/147 |
| 5,070,429 A | * | 12/1991 | Skirpan | ...................... 361/828 |
| 5,072,071 A | * | 12/1991 | Cassity et al. | ............ 174/65 R |
| 5,202,538 A | * | 4/1993 | Skirpan | ..................... 174/65 R |
| 5,326,934 A | | 7/1994 | LeMaster et al. | |
| 5,370,553 A | * | 12/1994 | Zimmerman | ................. 361/827 |
| 5,378,058 A | * | 1/1995 | Tessmer | ................... 312/223.6 |
| 5,477,649 A | * | 12/1995 | Bessert | ......................... 52/263 |
| 5,536,079 A | * | 7/1996 | Kostic | ...................... 312/223.1 |
| 5,573,321 A | * | 11/1996 | Bell, Jr. | ........................ 174/48 |
| 5,574,251 A | * | 11/1996 | Sevier | ........................ 174/50 |
| 5,627,720 A | * | 5/1997 | Lewis | ......................... 361/627 |
| 5,784,249 A | * | 7/1998 | Pouliot | ...................... 174/68.1 |
| 5,905,631 A | * | 5/1999 | Winkler | .................... 312/223.1 |
| 6,102,214 A | * | 8/2000 | Mendoza | ..................... 361/826 |
| 6,114,632 A | * | 9/2000 | Planas et al. | ............ 174/117 R |
| 6,308,477 B1 | * | 10/2001 | Santamaria | .............. 312/223.6 |
| 6,313,980 B1 | * | 11/2001 | Craft et al. | .................. 361/627 |

(Continued)

FOREIGN PATENT DOCUMENTS

EP     0621451     10/1994     ............ H02B/1/30

OTHER PUBLICATIONS

European Patent Office Search Report in Counterpart Case 02 07 5873.

*Primary Examiner*—Dean A. Reichard
*Assistant Examiner*—Angel R. Estrada
(74) *Attorney, Agent, or Firm*—Locke Liddell & Sapp LLP

(57) ABSTRACT

The present invention is directed to an electrical equipment enclosure assembly, particularly those used to house power distribution equipment. The enclosure uses the internal structural members and panel components to form the enclosure frame. The present invention is also designed to be mounted in the 2 ft.×2 ft. (600 mm×600 mm) tile space provided in raised flooring. The enclosure is also provided with a junction box that is mounted beneath the raised flooring to allow users to terminate wiring.

21 Claims, 11 Drawing Sheets

U.S. PATENT DOCUMENTS 6,348,655 B1 * 2/2002 Wright ........................ 174/50
6,430,882 B1 * 8/2002 Feldpausch et al. ........ 52/220.1
6,445,585 B1 * 9/2002 Walker ........................ 361/724
6,563,048 B2 * 5/2003 Holt et al. .................... 174/50

* cited by examiner

REMOTE DISTRIBUTION CABINET

CROSS-REFERENCE TO RELATED APPLICATIONS

This application claims the benefit of United States Provisional Patent Application Ser. No. 60/272,842, filed on Mar. 2, 2001 and having the title "Enclosure Assembly" and naming the same inventors identified herein, which provisional application is hereby incorporated by reference in its entirety.

BACKGROUND OF THE INVENTION

The influx of rack equipment in client/server, telecommunications process control, vibration monitoring, and numerous other electrical and electronic equipment environments has created a need for greater numbers of individual power branch circuits. These devices are smaller than the predecessors, more numerous, densely packed and consume less power. Because of this, most power distribution units expand their circuit breaker poles prior to exceeding their rated capacity. Present solutions to this problem require adding more electrical enclosures housing additional circuit breakers, or building larger, bulkier enclosures capable of housing the requisite additional breakers. As is evident, this requires additional space, expending the space available for additional electrical equipment and/or electronic components.

Available power distribution enclosures have a number of disadvantages that are particularly noticeable when a single enclosure having a large number of branch circuits is required. Prior art power distribution enclosures having a large number of branch circuits typically comprise frame structural cabinet and post members in addition to panel frame members that increase the size of the enclosure and limit the space avaiable for branch circuit panelboards. In addition, the installation of such enclosures in a raised floor environment typically requires that floor tiles be cut to allow cable entry. Such enclosures may also require the entire raised floor tile be removed and the enclosure set on the structural floor beneath causing a gapped space in the raised floor. Conversely, if the enclosure is too large it overlaps to adjacent tiles causing the inability to remove the adjacent tiles if needed. Yet another limitation of prior art designs is the lack of ability for users to have neat, easily accessible, and efficient installations because of numerous wires that extend from the enclosure branch circuits to the space under the raised floor.

SUMMARY OF THE INVENTION

The present invention is directed to a remote distribution cabinet, which overcomes the design and installation limitations of prior art power distribution enclosures. In one embodiment of the present invention, the remote distribution cabinet uses structural members and internal panelboard components as the frame assembly. This design contains fewer structural components than prior art designs, and thereby allows the remote distribution center to house, for example, 168 branch circuit devices (the equivalent of four full panelboards) in a relatively small area. Moreover, having fewer structural components requires less welding during assembly resulting in simplified and less costly remote distribution cabinet construction.

Unlike prior art remote distribution cabinets, a remote distribution cabinet in accordance with the present invention includes no isolation transformer, which helps to minimize the space required by the remote distribution cabinet. By separating the transformer from the panelboard function, a remote distribution cabinet in accordance with the present invention may be extremely compact, so that it will fit within the area of a standard 24-inch raised-floor tile while still permitting removal of adjacent floor tiles.

For strength, the structural members can be ribbed and/or made of a myriad of materials having various strengths. The structural members can be a substantially solid sheet or having a substantial opening allowing access to the electrical equipment and/or any associated wiring. The remote distribution cabinet can also include covers surrounding the structural members, with at least one cover being a door providing access to the branch circuit devices.

In one embodiment, the remote distribution cabinet is designed to fit into the space of a standard 2 ft.×2 ft. (600 mm×600 mm) raised floor tile, which allows adjacent tiles to be removed without disturbing the enclosure. In this design, the bottom member of the remote distribution cabinet can replace the raised floor tile. Moreover, the bottom member includes a void space, eliminating the need to cut raised floor tiles for cable entry. In addition, the remote distribution cabinet design eliminates tripping hazards created by gap spaces in the raised floor caused by users removing entire tiles to set the enclosure on the structural floor beneath. Further, the remote distribution cabinet may include a junction box that is beneath the floor and attached to the remote distribution cabinet bottom member, thereby allowing users to terminate input and output cables in the junction box for a more efficient installation.

Despite its small size, a remote distribution cabinet in accordance with the present invention, has increased accessibility. Accessibility is provided by the use of inline 42-pole panelboards with wide access channels. Up to four panelboards are separated into vertical compartments with individual hinged access covers. Any compartment can be serviced without exposing the wiring of the other three panelboards.

Additionally, the conduit landing place at the base of a remote distribution cabinet in accordance with the present invention may feature up to 168 holes. Additionally, the holes in the first row may be over-punched from ½-inch to ¼-inch without interfering with adjacent holes.

The remote distribution cabinet may also feature clear insert panels to allow inspection of the circuit breakers without opening the cabinet, tie breakers to allow the internal panelboards to be connected to different inputs, and adjustable access panels to compensate for breaker creep.

In yet another aspect of a remote distribution cabinet in accordance with the present invention, the individual panelboards within the enclosure may receive power from different sources, which enables the remote distribution cabinet to provide fault-tolerant, fully maintainable dual-bus power. A power distribution cabinet in accordance with the present invention may also be configured as a dual input unit. Such a unit is constructed with two panelboards on each side sharing common input terminals.

A remote distribution cabinet in accordance with the present invention may also include a current monitoring panel for monitoring the currents in each panelboard.

In yet another aspect of the present invention, the internal panel may be formed using a DIN rail assembly, wherein the branch circuit devices are mounted on DIN rails, and the structural members are affixed to the DIN rail assembly to form the rigid structural frame.

Figure 1:
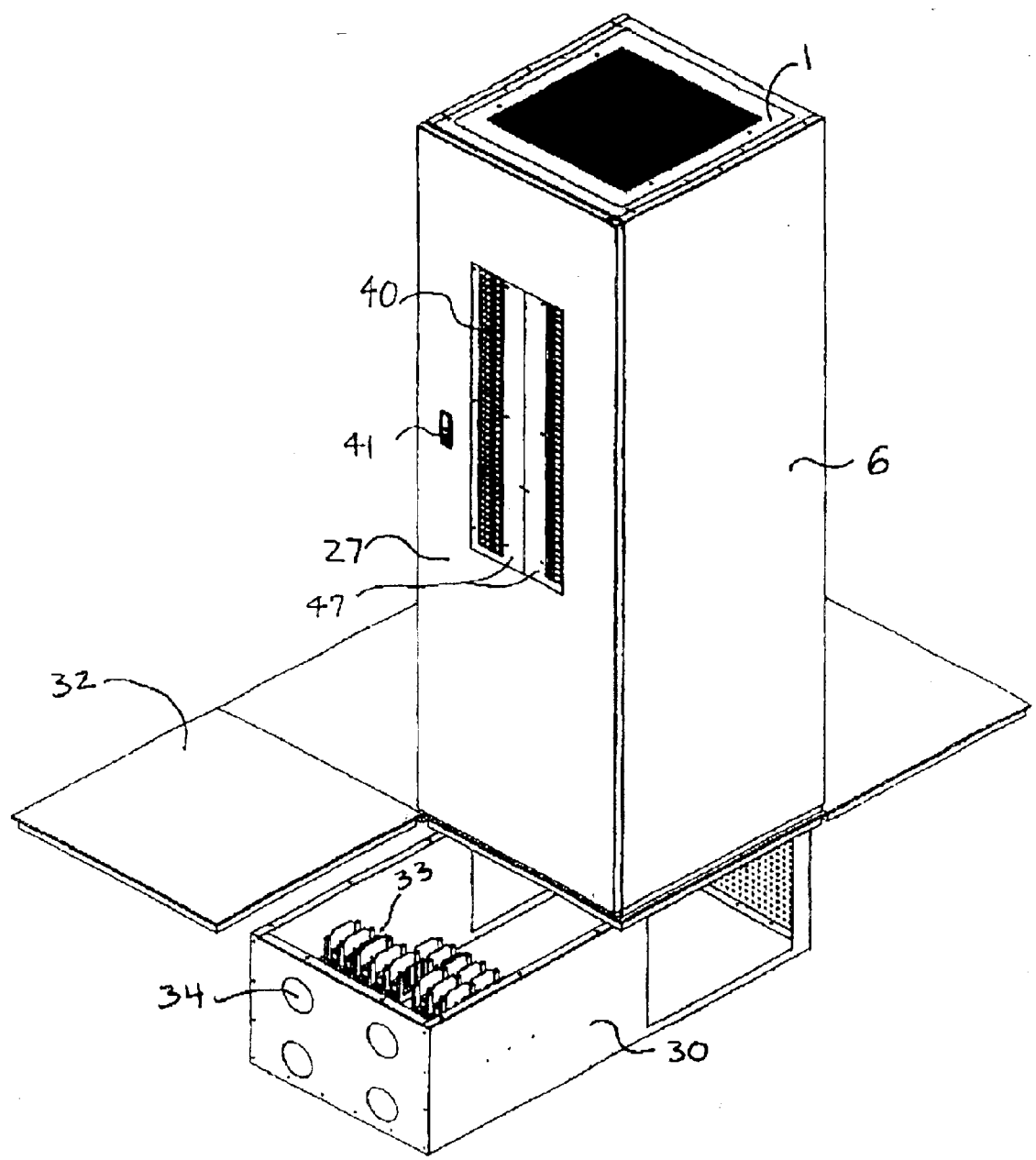
FIG. 1 shows a remote distribution cabinet in accordance with the present invention with a door, outer side cover, and junction box attached.

While the present invention is susceptible to various modifications and alternative forms, specific embodiments are shown by way of example in the drawings and are described in detail herein. However, it should be understood that the invention is not limited to the particular forms disclosed. Rather, the invention includes all modifications, equivalents, and alternatives within the scope of the appended claims.

DESCRIPTION OF ILLUSTRATIVE EMBODIMENTS

The outer portion of a remote distribution cabinet in accordance with the present invention is illustrated in FIG. 1. The remote distribution cabinet includes a door 27, door latch 41, side member cover 6, a screened protective top 1, and a doubled-tile size junction box 30 beneath the raised floor 32 and attached to the bottom member (see FIG. 2) of the remote distribution cabinet. Also illustrated in FIG. 1 are a number of branch circuit breakers 40. As shown, these circuit breakers 40 are operable without the need to open the enclosure door 27. However, it can be appreciated that a clear insert panel or cover (not shown) can be added for viewing of circuit breaker 40 positions without opening the cabinet. Such a cover may be made of Plexiglas® material or a similar transparent material.

Figure 2:
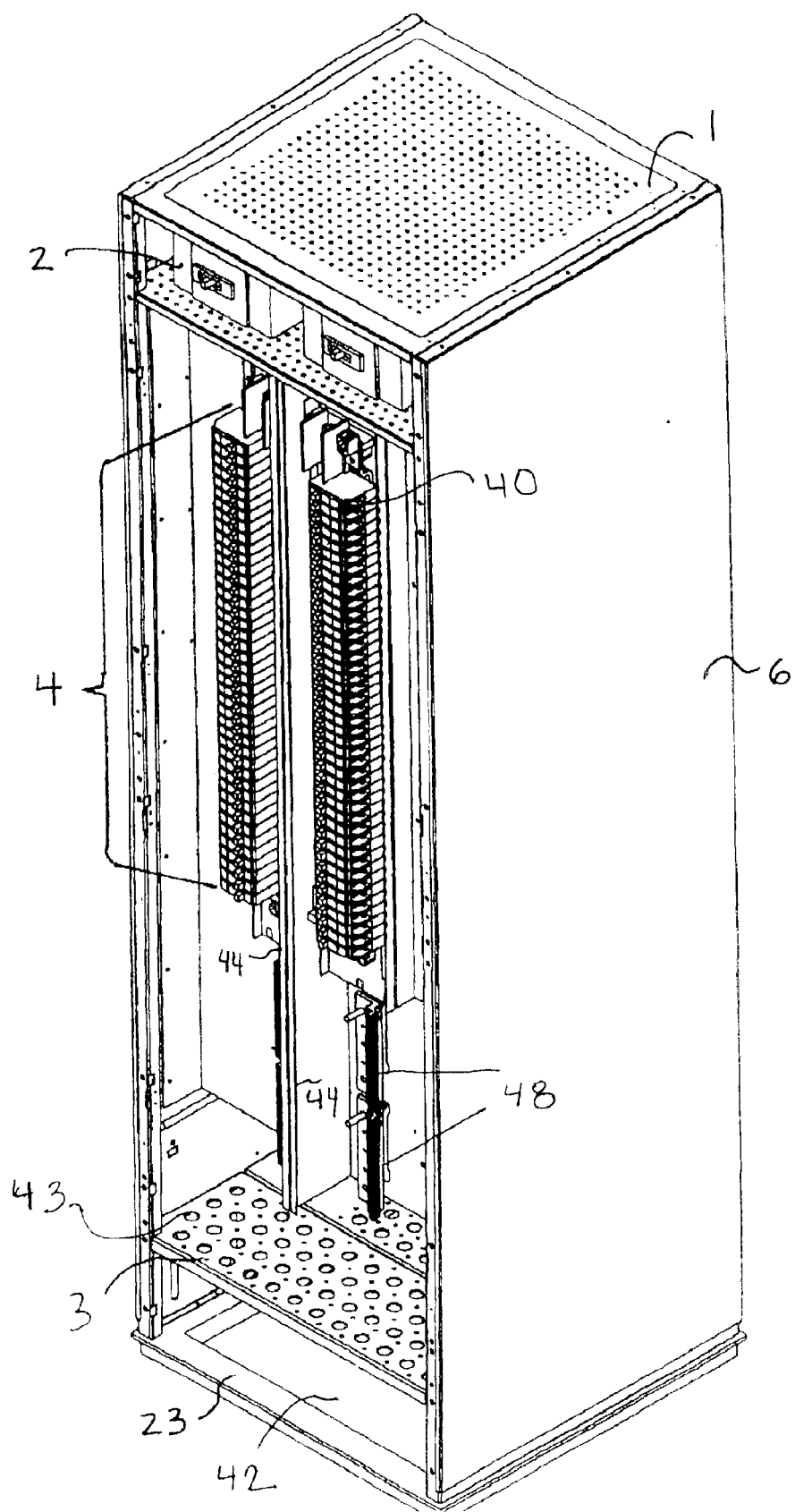
FIG. 2 shows a remote distribution cabinet in accordance with the present invention with the door removed and the outer side cover attached.

FIG. 2 illustrates a remote distribution cabinet in accordance with the present invention with the door removed and the outer side cover 6 attached. The remote distribution cabinet includes a screened protective top 1, main panel circuit breakers 2, commercial panelboards 4 (e.g. Square D type) having a plurality of circuit breakers 40, side members cover 6, conduit panel 3, having holes 43, and bottom member 23 with a void portion 42. Bottom member 23 includes an outer edge portion for placement on a raised floor 32 as depicted in FIG. 1. The void 42 of bottom member 23 allows wiring to pass from a raised floor 32 through the conduit panel holes 43 to the panelboards 4. The conduit panel 3 can be made of three inserts having a total of 168 holes 43—some that may be over-punched to diameters of ¾-inch without interfering with adjacent conduit panel holes 43. The plurality of conduit panel holes 43 allow matching of the size and number of cable/conduit openings for varying end user requirements and to provide for a neater more efficient installation. Also depicted in FIG. 1 are access covers 47 that separately cover the wiring and potentially energized components of the individual panelboards 4. The enclosure also includes isolated neutral and safety-ground bus bars 48.

Figure 3:
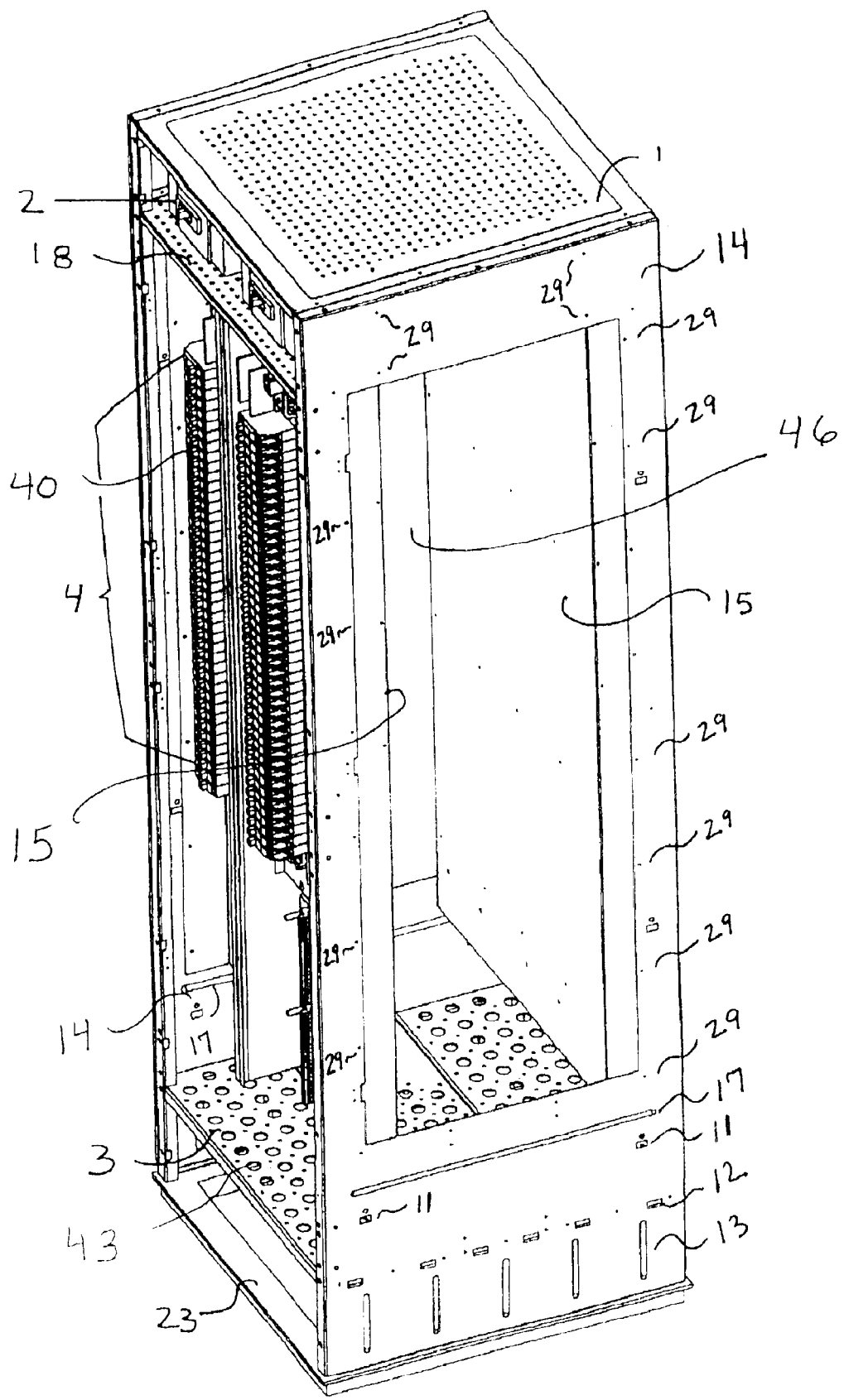
FIG. 3 illustrates the internal structural components of a remote distribution cabinet in accordance with the present invention.

The internal structural and device components of a remote distribution cabinet in accordance with the present invention are illustrated in FIG. 3. Structural members 14 represent part of the remote distribution cabinet frame and comprise a single sheet of galvanized steel with ribs 17 and 13 to provide a strong substructure. The structural members 14 are designed with a plurality of connection holes 29 for attachment of various components including the screened protective top 1, internal panels 15 (see FIG. 7), and main panel circuit breaker 2 support and ventilation attachment 18 (see FIG. 4). Attachment of the enclosure components may be by any fastening means, such as screws, pins, connectors or rivets placed within the structural member connection holes 29 and the corresponding connection holes on the various components. The structural members 14 are also designed with lances 12, which hold the conduit panel 3 inserts in place and connector openings 11, which attach side member cover 6 (see FIG. 2) to structural members 14. The structural members 14 also include opening 46, which allows access to the panelboard 4 as well as any associated wiring. While FIG. 3 shows the structural members 14 having an opening 46, structural members 14 may also be substantially solid members, especially in applications where only rear access to the remote distribution cabinet internal wiring on components is needed.

Figure 7:
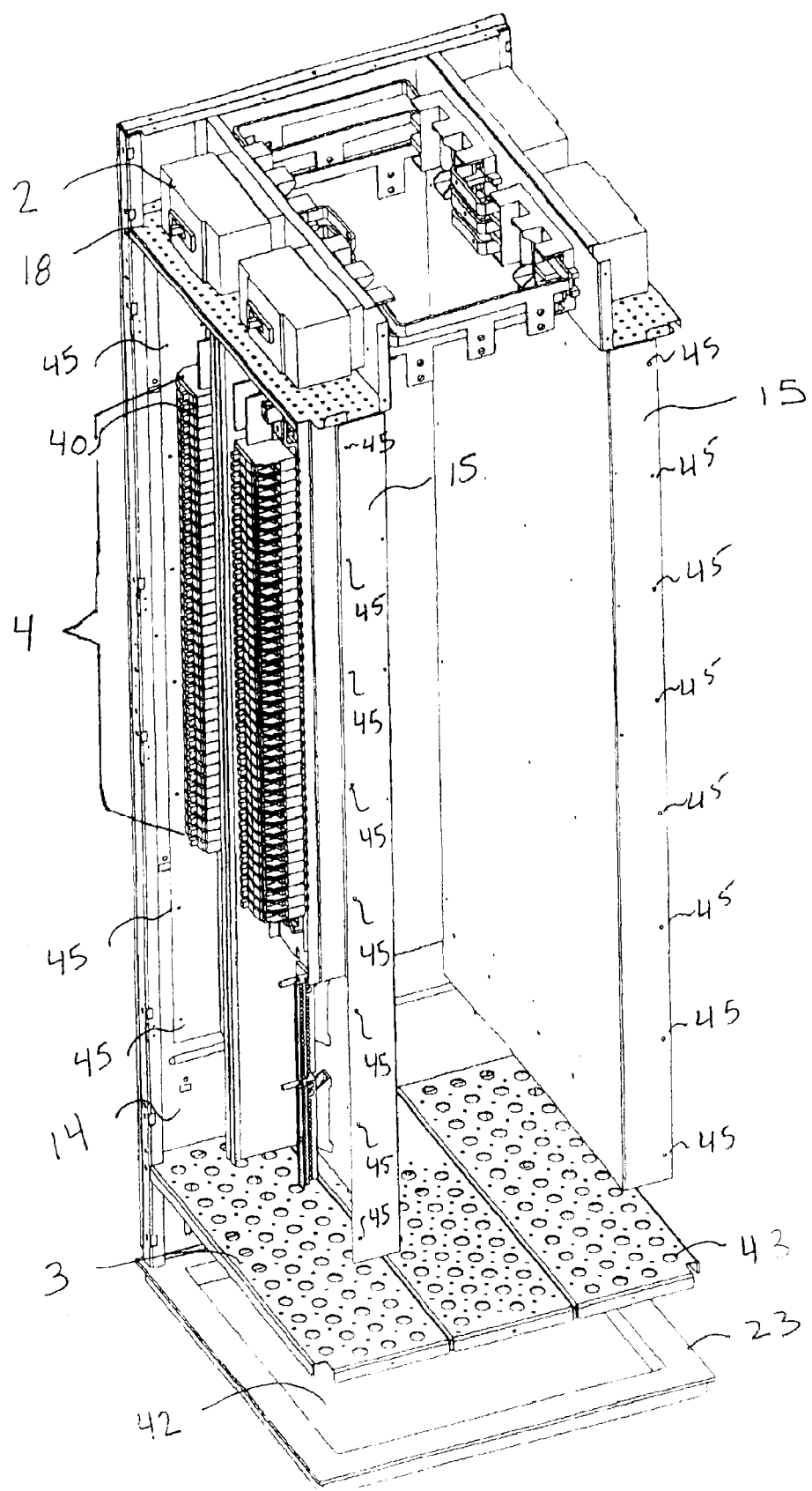
FIG. 7 illustrates detail of the internal panels of a remote distribution cabinet in accordance with the present invention.

More details of internal panels 15 are shown in FIG. 7. The internal panels 15 may be made of painted steel, galvanized steel, aluminum or other suitable materials. Moreover, for added strength the internal panels 15 can include ribs (not shown). Panelboards 4 having circuit breakers 40 are attached to the internal panels 15 via connectors, screws, pins or rivets. Structural members 14 are affixed to internal panel 15 by placing a fastener through panel 15 connector holes 45 into structural member 14 connector holes 29 (see FIG. 3).

The present invention overcomes the deficiencies of the prior are in that the attachment of structural members 14 to internal panel 15 and panelboard 4 forms the frame structure of the remote distribution cabinet to, which bottom member 23 (see FIG. 2) is attached. This design incorporates the internal panels 15 and panelboard 4 into the frame structure and eliminates the need for post or cabinet members that are found in typical enclosures. Further, this design requires less welding than typical enclosures during construction. Moreover, this construction allows more space, for example, allowing 168 branch circuit breakers 40 in a single floor-tile sized enclosure.

Figure 9:
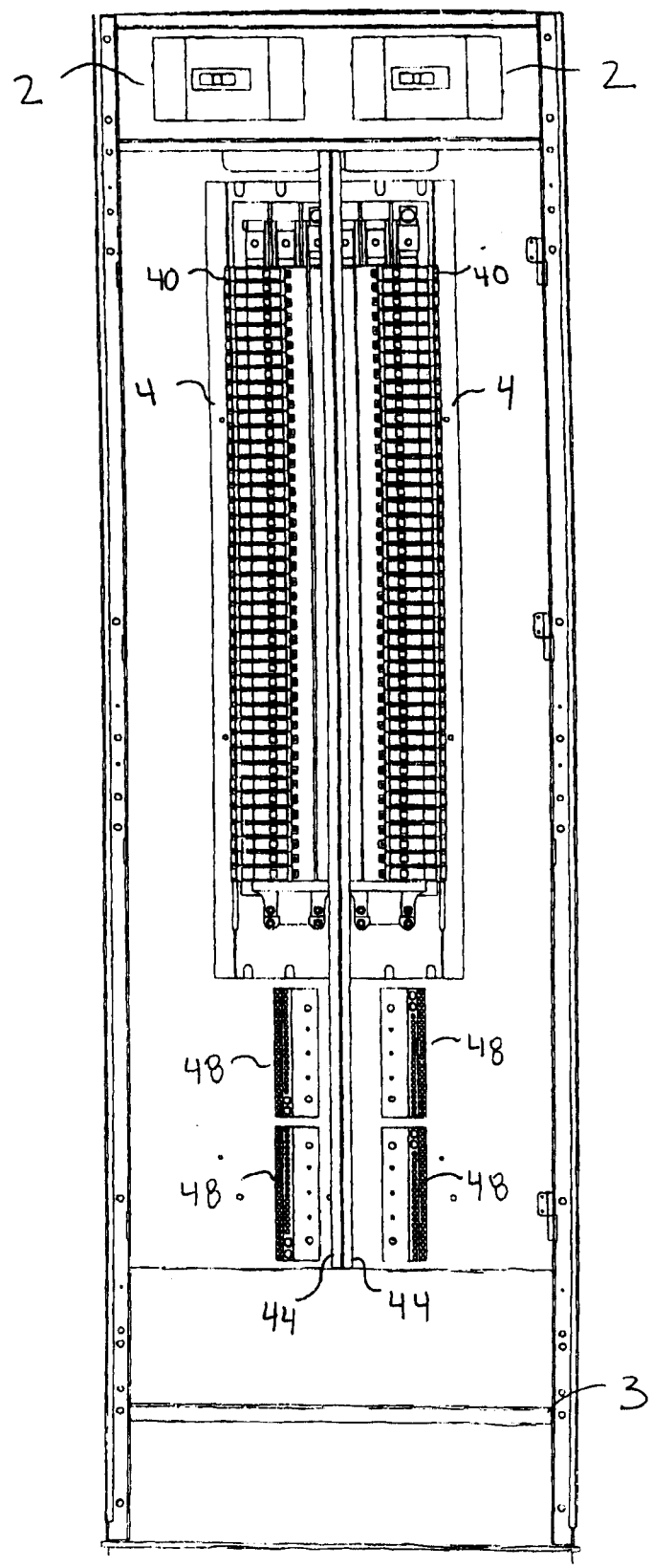
FIG. 9 illustrates a front view of the interior of a remote distribution cabinet in accordance with the present invention.
Figure 10:
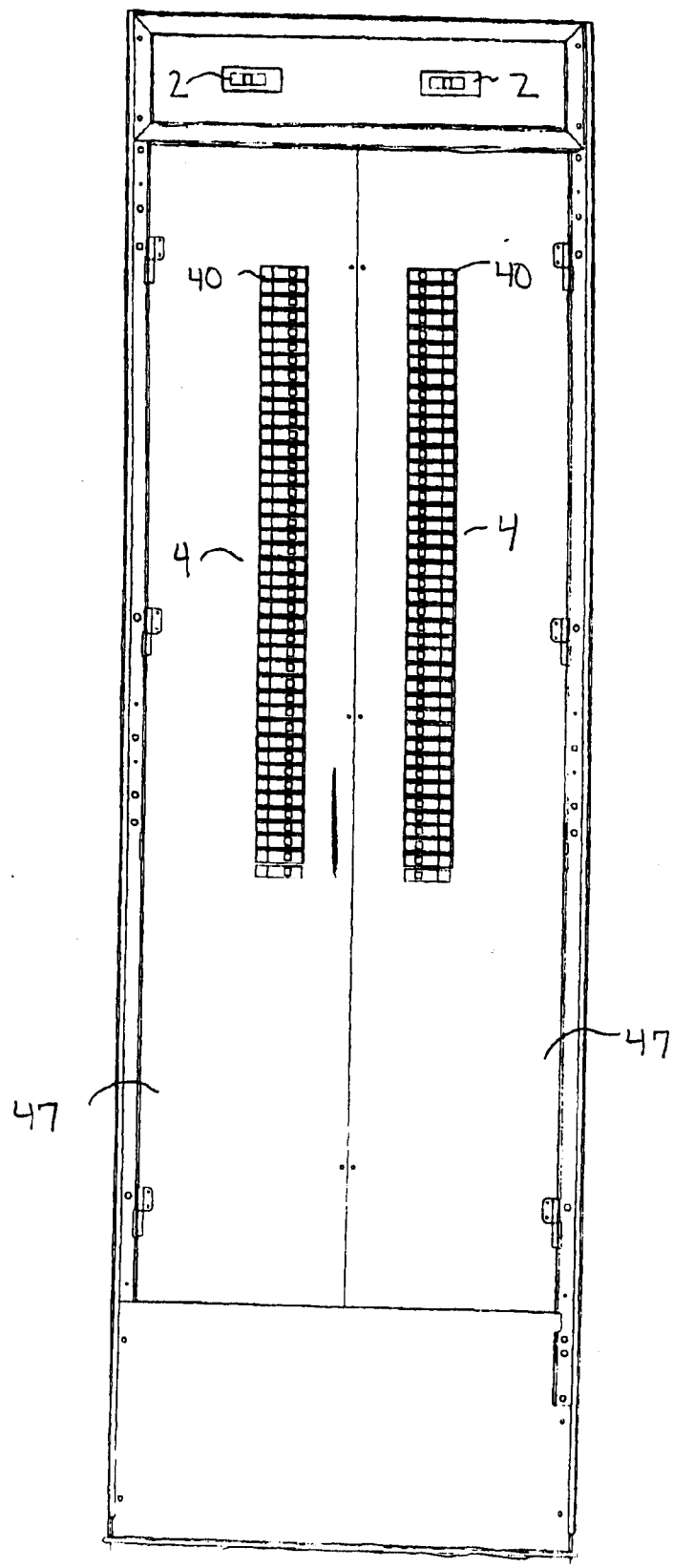
FIG. 10 illustrates a front view of a remote distribution cabinet having hinged panelboard access covers.

Although the enclosure is small in size and has the ability to house 168 branch circuit breakers 40, because of its novel design of using the internal panel and structural members to form the frame assembly it has increased accessibility to the panel components. Referring to FIGS. 2, 9, and 10 the panelboards 4 have wide access channels and may house up to 42 circuit breakers each. Although only two panelboards 4 having a combined total of eighty-four circuit breakers 40 are illustrated, it can be appreciated that an identical configuration of panelboards 4 is located at the rear of the enclosure for a total of four panelboards 4 having a combined total of 168 branch circuit breakers 40. Internal panels 15 (see FIG. 3) include dividers 44, which separate the panelboards 4 into individual vertical compartments. Each panelboard compartment includes isolated neutral and safety-ground bus bars 48. Each panelboard compartment also has a hinged access cover 47 as shown in FIG. 10, which allows any individual panelboard 4 to be serviced without exposing the wiring and electrical connections of the other panelboards 4. The hinged access covers 47 includes mechanical adjustments to allow proper fit over the branch breakers and to compensate for breaker creep.

Figure 4:
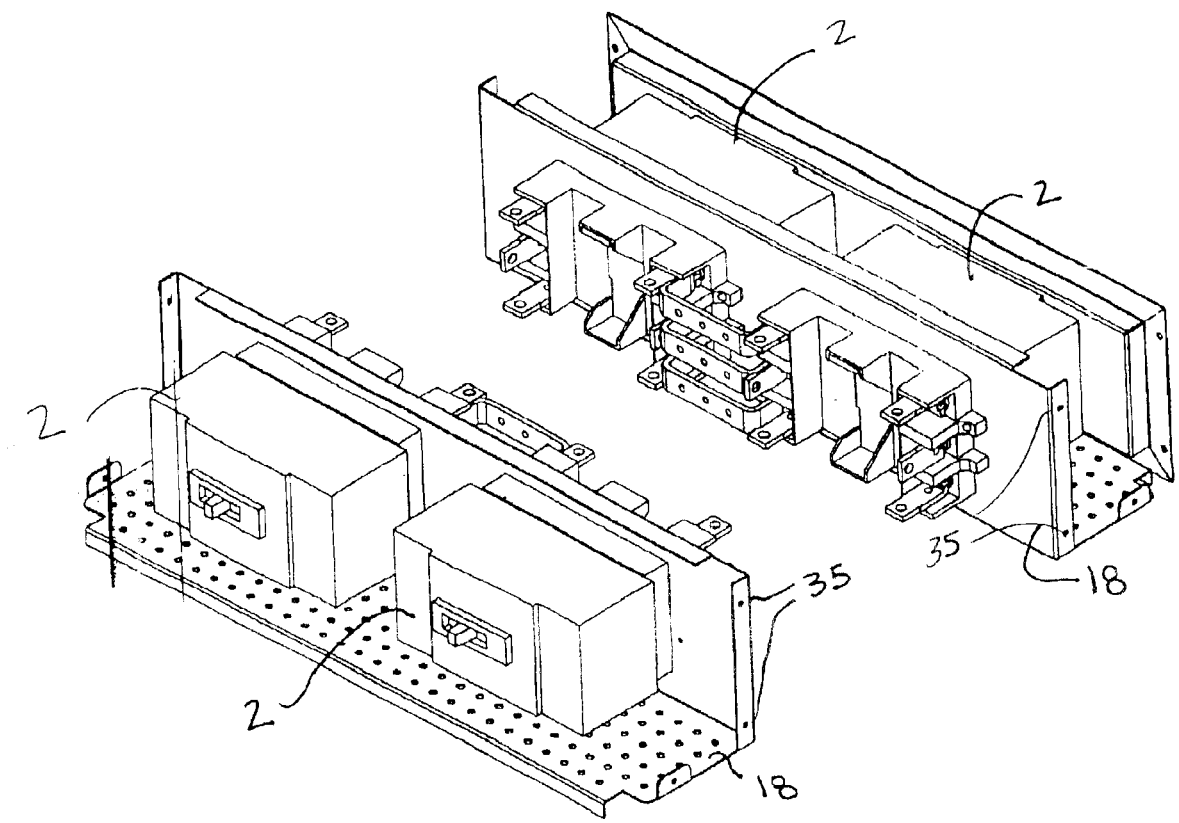
FIG. 4 shows detail of the main circuit breaker ventilation and support attachments.

FIG. 4 shows detail of the ventilation and support attachments 18 for the main panel circuit breakers 2. The main panel circuit breaker 2 ventilation and support attachment 18 are mounted to structural members 14 (see FIG. 3) via connection holes 35 and the structural member 14 connection holes 29. Ventilation and support attachments 18 aid in the natural convection cooling of the enclosure and the screened protective top 1 (see FIG. 2) assists in heat rejection.

Each main panel circuit breaker 2 is electrically connected to an individual panelboard 4, allowing the panelboards 4 to receive power from different sources, providing fault-tolerant, fully maintainable dual-bus power. This design also enables service to one panelboard 4 without requiring the removal of power from the other panelboards 4. Although each panelboard 4 can receive power from different sources, tie breakers (see FIG. 11 and the discussion below) can also be installed to allow the panelboards 4 to be connected to different power inputs. While FIG. 4 depicts four (4) main panel circuit breakers 2, it should be appreciated that a single input or dual input enclosure can be configured, the dual input configured with two panelboards 4 sharing common input terminals or main panel circuit breakers 2. In addition to the multiple power input configuration, the enclosure may also include a current monitoring panel (see FIG. 11 and the discussion below) for monitoring the phase and neutral currents for each panelboard.

Figure 11:
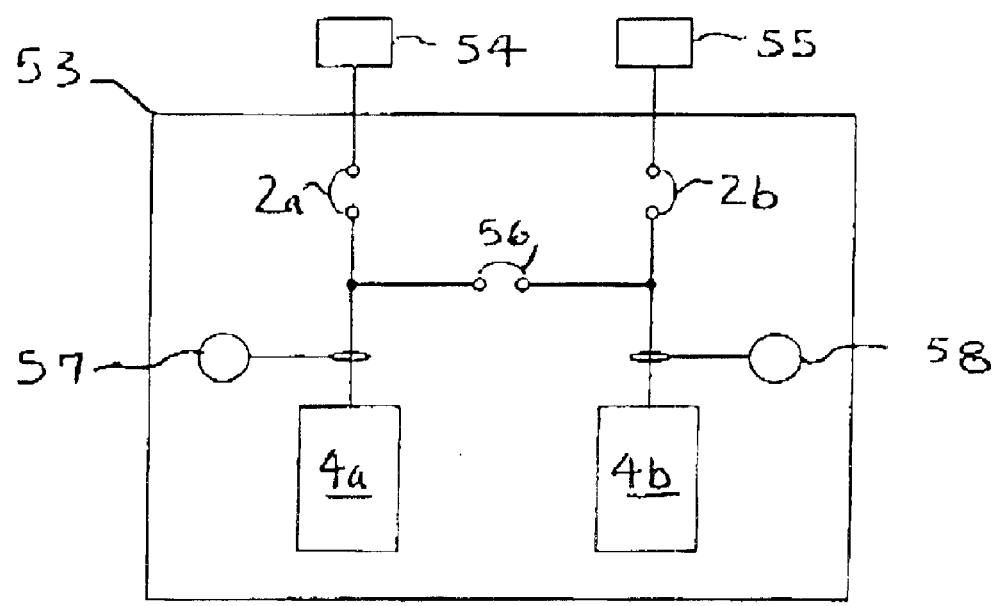
FIG. 11 illustrates a block diagram of a remote distribution cabinet having a tie-breaker and a current monitoring unit.

Referring to FIG. 11, a block diagram of one embodiment of a distribution cabinet 53 of the present invention is shown. As shown, the distribution cabinet 53 includes only two panelboards—first panelboards 4a and second panelboards 4b; however, as previously mentioned the distribution cabinet could have additional or fewer panelboards 4. The power source at first terminal 54 is electrically coupled to main circuit breaker 2a, which is electrically coupled to first panelboard 4a. A first current monitoring unit 57 is configured to monitor phase and/or neutral currents for first panelboard 4a. The power source at second terminal 55 is electrically coupled to main circuit breaker 2b, which is electrically coupled to second panelboard 4b. A second current monitoring unit 58 is configured to monitor phase and/or neutral currents for second panelboard 4b. FIG. 11 also illustrates tie-breaker 56, which allows either panelboard 4a or 4b to receive power from the power sources at first terminal 54 or second terminal 55.

Figure 5:
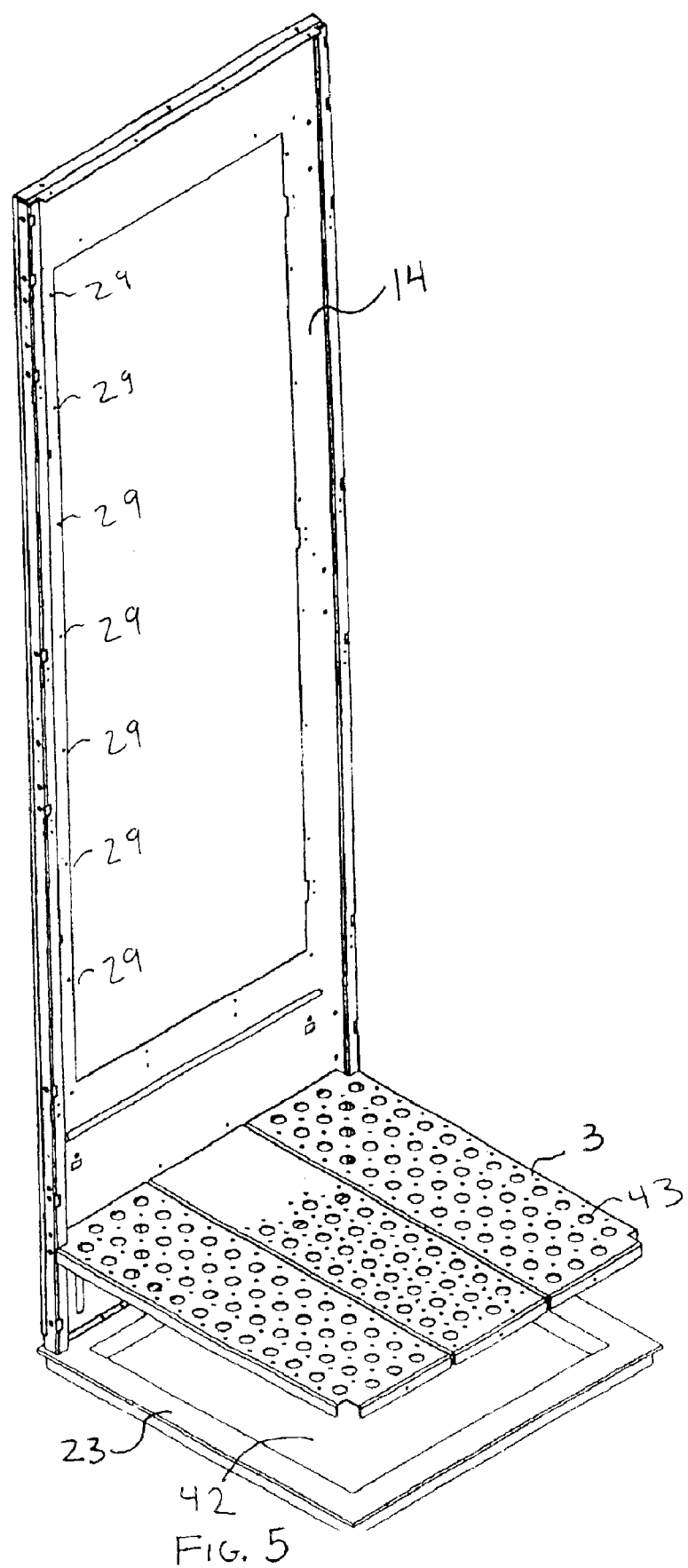
FIG. 5 illustrates frame members of a remote distribution cabinet in accordance with the present invention.

The bottom member 23 is attached to structural members 14 and is illustrated in FIG. 5. The bottom member 23 has a void 42 to allow cabling to enter the remote distribution cabinet. In one embodiment, bottom member 23 is also constructed with an outer edge that fits into the tile space opening a 2 ft×2 ft. (600 mm×600 mm) raised floor, replacing the tile. Another aspect in which a remote distribution cabinet constructed in accordance with the present invention overcomes the limitations of prior art is that bottom member 23 allows the user to replace tiles in raised flooring with the enclosure, which allows adjacent tiles to be removed without disturbing the remote distribution cabinet. Use bottom member 23 also eliminates the need for cutting tiles for cable entry. This design also eliminates the necessity of removing tiles and placing the remote distribution cabinet directly on the floor creating gapped spaces and tripping hazards.

Figure 6:
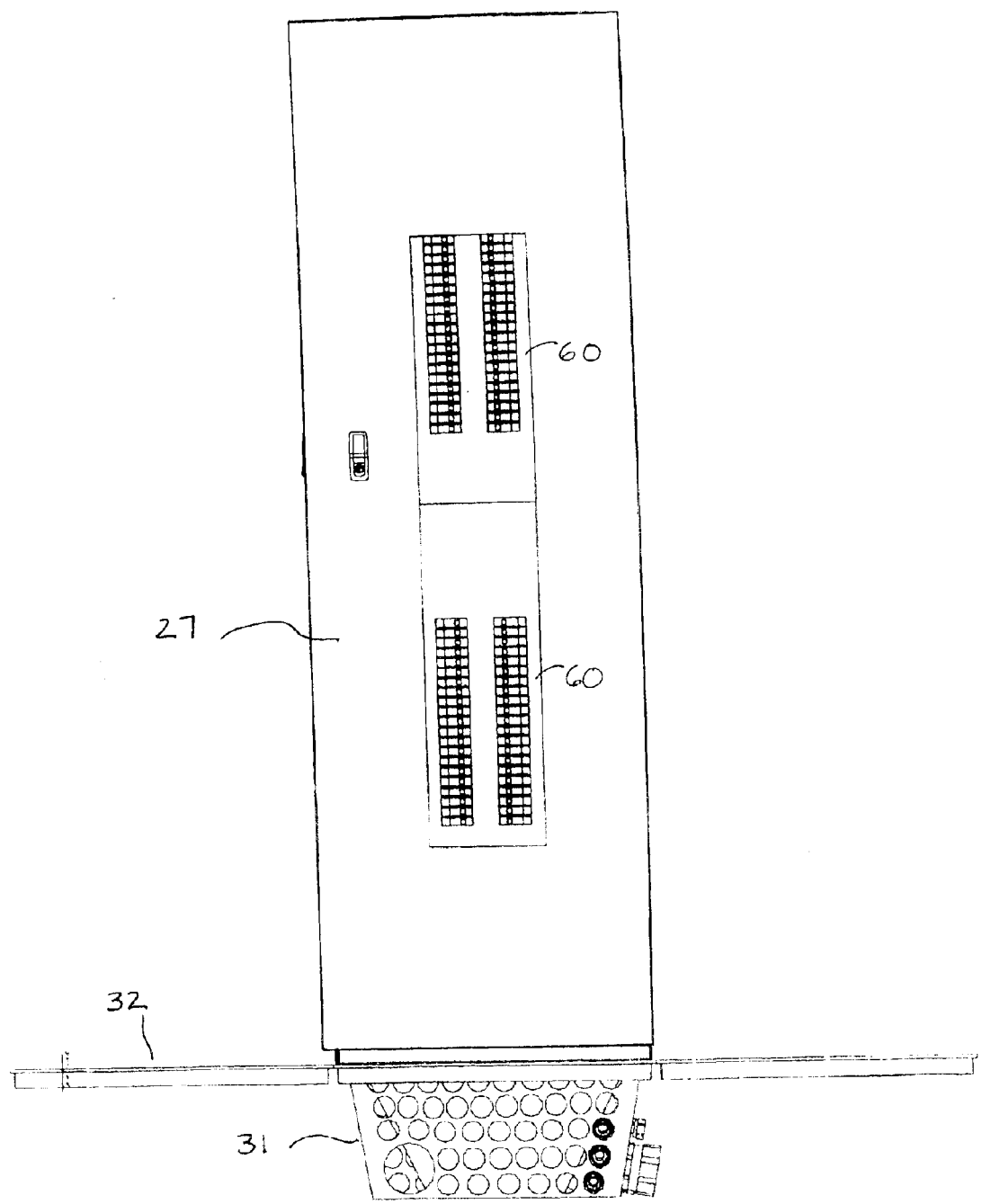
FIG. 6 illustrates a single-tiled junction box attached to the bottom member of a remote distribution cabinet in accordance with the present invention.

A remote distribution cabinet in accordance with the present invention may also include a doubled-tile size junction box 30 or a single-tile junction box 31 attached to bottom member 23, which are illustrated in FIG. 1 and FIG. 6 respectively. The junction boxes 30 and 31 being beneath the raised floor 32 and having terminal strips 33 and conduit and cable knockouts 34 allow the user to terminate wiring for more efficient installations. Also depicted in FIG. 6 is an alternate design of the enclosure that has the one panelboard 60 mounted atop the other rather than the juxtaposed configuration shown in FIG. 1.

Figure 8:
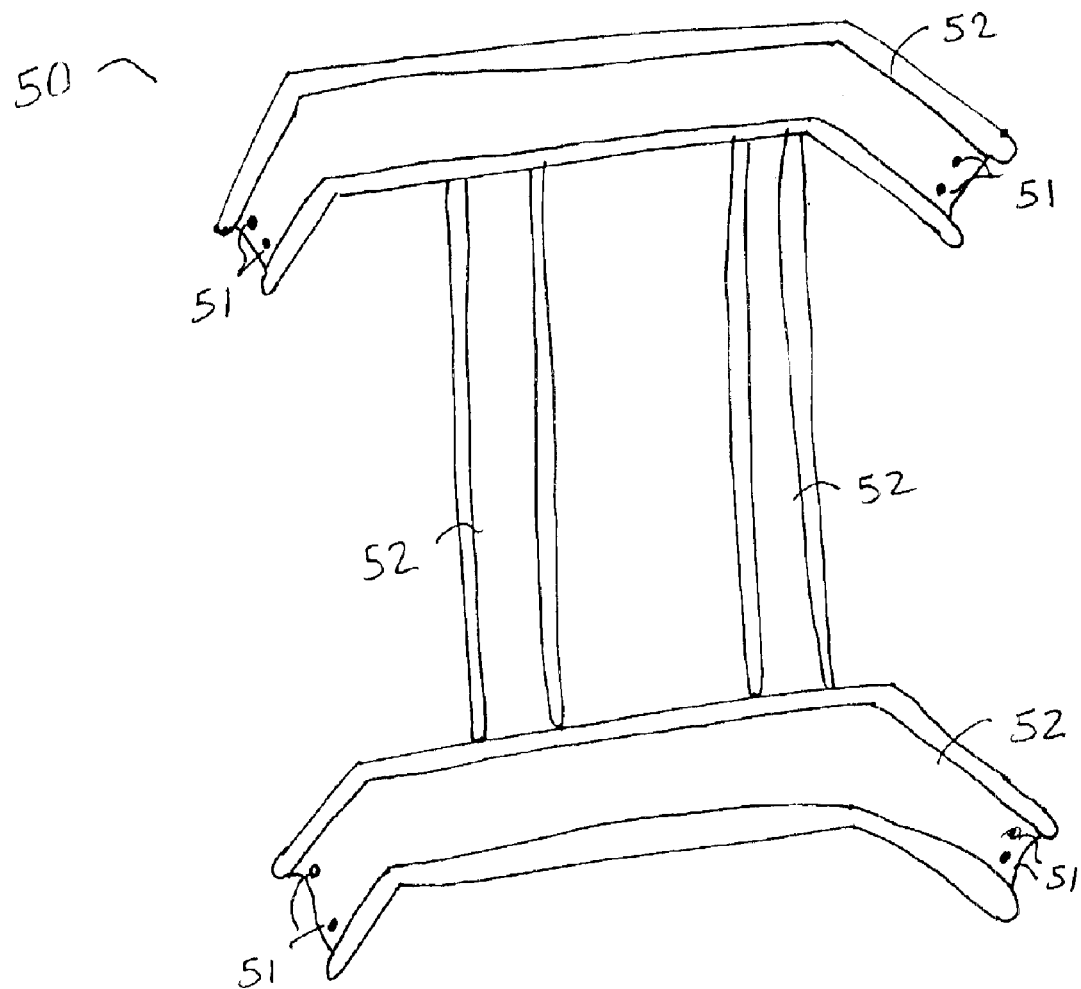
FIG. 8 illustrates internal structural components of a remote distribution cabinet including a DIN rail assembly in accordance with the present invention.

As illustrated in FIG. 8, a remote distribution cabinet in accordance with the present invention may also be constructed with an assembly of DIN rails 52 that form an internal member 50 having connector holes 51 to which structural members 14 (see FIG. 5) are affixed via structural member connection holes 29. In this embodiment, circuit breakers having DIN rail mounts (not shown) are attached to the DIN rail assembly internal member 50. This design incorporates the DIN rail assembly internal member 50 into the frame structure and also eliminates the need for post or cabinet members that are found in prior art remote distribution cabinets.

Additional modification and adaptations of the disclosed embodiment are possible without departing from the scope of the present invention. It is intended that the invention embrace all embodiments within the scope of the following claims.

What is claimed is:

1. A remote distribution cabinet comprising:
   at least one internal panel;
   at least one panelboard attached to the internal panel, said panelboard having a plurality of circuit breakers thereon;
   a plurality of structural members forming a portion of an exterior surface of said cabinet, said structural members being attached to the internal panel thereby forming a frame structure including the structural members, the internal panel and the panelboard; and
   a bottom member attached to the structural members.

2. The remote distribution cabinet of claim 1 wherein the bottom member is sized to allow the remote distribution cabinet to fit within a raised floor tile space.

3. The remote distribution cabinet of claim 2 further comprising a junction box attached to the bottom member so as to be disposed beneath a raised floor.

4. The remote distribution cabinet of claim 1 further comprising at least one access panel covering the plurality of circuit breakers.

5. The remote distribution cabinet of claim 4 wherein the access panel allows visual inspection of the circuit breakers without opening the access panel.

6. The remote distribution cabinet of claim 4 wherein said access panel is adjustable to allow for a shift in the position of the circuit breakers within the panelboard.

7. The remote distribution cabinet of claim 1 comprising at least two panelboards wherein one or more panelboards are arranged to receive power from different sources.

8. The remote distribution cabinet of claim 7 further comprising a tie-breaker for providing power from one of a plurality of sources to one or more panelboards.

9. The remote distribution cabinet of claim 1 further comprising a tie-breaker for providing power from one of a plurality of sources to one or more panelboards.

10. The remote distribution cabinet of claim 1 further comprising a current monitoring unit arranged to measure the current of each panelboard.

11. The remote distribution cabinet of claim 1 further comprising at least one main circuit breaker for each panelboard.

12. The remote distribution cabinet of claim 1 further comprising an access panel separately covering each of the at least one panelboards, wherein when the access panel is removed, service can be performed on the at least one panelboard without exposing other energized components of the remote distribution cabinet.

13. The remote distribution cabinet of claim 12 wherein the access panel allows visual inspection and operation of the panelboard circuit breakers without opening the access panel.

14. The remote distribution cabinet comprising:
   at least one internal panel having at least one panelboard affixed thereto;
   a frame structure comprising a plurality of structural members, each of said structural members forming a portion of an exterior surface of said cabinet; and
   means for incorporating said panelboard and internal panel into said frame structure.

15. The remote distribution cabinet of claim 14 wherein the means for incorporating said panelboard into the frame structure includes a bottom member sized to allow the remote distribution cabinet to fit within a raised floor tile space.

16. The remote distribution cabinet of claim 15 further comprising a junction box attached to the bottom member so as to be disposed beneath a raised floor.

17. The remote distribution cabinet of claim 14 wherein the panelboard comprises a plurality of circuit breakers and the remote distribution cabinet further comprises at least one access panel covering the plurality of circuit breakers.

18. The remote distribution cabinet of claim 17 wherein the access panel allows visual inspection of the circuit breakers without opening the access panel.

19. The remote distribution cabinet of claim 17 wherein said access panel is adjustable to allow for a shift in the position of the circuit breakers within the panelboard.

20. The remote distribution cabinet of claim 14 comprising at least two panelboards wherein one or more panelboards are arranged to receive power from different sources.

21. The remote distribution cabinet of claim 20 further comprising a tie-breaker for providing power from one of a plurality of sources to one or more panelboards.

* * * * *

UNITED STATES PATENT AND TRADEMARK OFFICE
CERTIFICATE OF CORRECTION

PATENT NO. : 6,881,898 B2
DATED : April 19, 2005
INVENTOR(S) : Robert E. Baker et al.

It is certified that error appears in the above-identified patent and that said Letters Patent is hereby corrected as shown below:

Column 7,
Line 20, replace "The" with -- A --.

Signed and Sealed this

Twenty-seventh Day of September, 2005

JON W. DUDAS
*Director of the United States Patent and Trademark Office*